(12) United States Patent
Baldwin

(10) Patent No.: US 8,443,099 B2
(45) Date of Patent: *May 14, 2013

(54) DYNAMIC MEDIA ASSET DELIVERY

(75) Inventor: James A. Baldwin, Redwood City, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/437,685

(22) Filed: Apr. 2, 2012

(65) Prior Publication Data

US 2012/0210015 A1 Aug. 16, 2012

Related U.S. Application Data

(63) Continuation of application No. 12/486,410, filed on Jun. 17, 2009, now Pat. No. 8,176,193.

(51) Int. Cl.
G06F 15/16 (2006.01)

(52) U.S. Cl.
USPC ........... 709/231; 709/203; 709/217; 709/224; 709/232; 725/105

(58) Field of Classification Search .................. 709/203, 709/217, 224, 226, 231–233, 223; 725/86, 725/105
See application file for complete search history.

(56) References Cited

U.S. PATENT DOCUMENTS

| 5,930,526 | A * | 7/1999 | Iverson | 710/35 |
|---|---|---|---|---|
| 6,665,751 | B1 | 12/2003 | Chen et al. | |
| 6,801,964 | B1 | 10/2004 | Mahdavi | |
| 7,133,486 | B2 | 11/2006 | Zhang et al. | |
| 7,356,605 | B1 | 4/2008 | Khouri et al. | |
| 7,548,585 | B2 | 6/2009 | Kent, Jr. et al. | |
| 7,558,323 | B2 | 7/2009 | Aikawa et al. | |
| 7,573,886 | B1 | 8/2009 | Ono | |
| 7,630,612 | B2 | 12/2009 | Kent, Jr. et al. | |
| 7,647,418 | B2 * | 1/2010 | Ash et al. | 709/231 |
| 7,734,806 | B2 * | 6/2010 | Park | 709/232 |
| 7,886,069 | B2 | 2/2011 | Osborne | |
| 8,176,193 | B2 | 5/2012 | Baldwin | |
| 2003/0035592 | A1 * | 2/2003 | Cornog et al. | 382/284 |

(Continued)

FOREIGN PATENT DOCUMENTS

WO   WO-2005069296   7/2005

OTHER PUBLICATIONS

"DownloadServer—Monetize Through Viewer Ownership", Retrieved from <http://www.narrowstep.com/technology/internet-tv-download-server.aspx> on Mar. 20, 2009., 2 Pages.

(Continued)

Primary Examiner — Ramy M Osman
(74) Attorney, Agent, or Firm — Wolfe-SBMC

(57) ABSTRACT

In embodiments of dynamic media asset delivery, a media asset can be requested from a content distributor for playback at a client device. The client device can receive the media asset over a communication network, and receive a request to playback the media asset for viewing as the media asset is being received. The client device can then playback the media asset for viewing in a display format, where a quality of the display format is based at least in part on a time duration between when the media asset is requested and when the request to playback the media asset for viewing is received.

20 Claims, 4 Drawing Sheets

U.S. PATENT DOCUMENTS

| | | | |
|---|---|---|---|
| 2003/0135867 A1 | 7/2003 | Guedalia | |
| 2004/0049793 A1* | 3/2004 | Chou | 725/87 |
| 2004/0128343 A1 | 7/2004 | Mayer | |
| 2005/0172030 A1 | 8/2005 | Fay | |
| 2005/0262265 A1 | 11/2005 | Ohtsuka | |
| 2006/0181612 A1* | 8/2006 | Lee et al. | 348/207.1 |
| 2007/0037557 A1 | 2/2007 | Shao | |
| 2007/0112973 A1 | 5/2007 | Harris | |
| 2007/0209005 A1 | 9/2007 | Shaver | |
| 2007/0283035 A1 | 12/2007 | Wang | |
| 2008/0059986 A1* | 3/2008 | Kalinowski et al. | 725/112 |
| 2008/0155623 A1 | 6/2008 | Ota | |
| 2008/0162670 A1* | 7/2008 | Chapweske et al. | 709/219 |
| 2008/0263608 A1* | 10/2008 | White | 725/100 |
| 2008/0288868 A1* | 11/2008 | Lakey et al. | 715/716 |
| 2009/0001173 A1* | 1/2009 | Sevier et al. | 235/462.41 |
| 2010/0303440 A1* | 12/2010 | Lin et al. | 725/118 |
| 2010/0325193 A1 | 12/2010 | Baldwin | |

OTHER PUBLICATIONS

"Final Office Action", U.S. Appl. No. 12/486,410, (Aug. 19, 2011),7 pages.

"Non-Final Office Action", U.S. Appl. No. 12/486,410, (Mar. 31, 2011),7 pages.

"Notice of Allowance", U.S. Appl. No. 12/486,410, (Jan. 4, 2012),4 pages.

"The Seamless Video Experience: How It's Possible", Retrieved from: http://www.imediaconnection.com/content/16197.asp., 3 Pages.

* cited by examiner

DYNAMIC MEDIA ASSET DELIVERY

RELATED APPLICATION

This application is a continuation of and claims priority to U.S. patent application Ser. No. 12/486,410, filed Jun. 17, 2009, entitled "Dynamic Media Asset Delivery", the disclosure of which is incorporated in its entirety by reference herein.

BACKGROUND

Internet-based television delivery systems are designed to stream video when requested by a user for immediate live viewing, or download the video in advance of when the user may want to watch the video after it has been recorded. In addition, a system may be setup so that the user can start playback of a video that is still downloading before the download is complete. This is commonly referred to as progressive playback. When a user initiates a request for a video, the user may then be requested to select any of the various options to begin either streaming the video, downloading the video, or downloading the video for progressive playback. These options can be confusing to a user who generally may not know or understand the differences in the options to obtain the video, such as when to download the video rather than stream the video, and vice-versa.

SUMMARY

This summary is provided to introduce simplified concepts of dynamic media asset delivery. The simplified concepts are further described below in the Detailed Description. This summary is not intended to identify essential features of the claimed subject matter, nor is it intended for use in determining the scope of the claimed subject matter.

Dynamic media asset delivery is described. In embodiments, a request for a media asset can be received from a client device. A transmission rate of a communication network is determined to deliver the media asset to the client device. The client device can be monitored to determine whether the media asset is initiated for playback at the client device. The media asset is then communicated to the client device in a highest quality display format as can be delivered according to the transmission rate of the communication network and whether the media asset is initiated for playback at the client device.

In other embodiments, an indication can be received that the media asset is initiated for playback at the client device, and a quantity of the media asset that has been delivered to the client device can be determined. Based on the quantity of the media asset that has been delivered, the media asset is then communicated to the client device in a lower quality display format to facilitate delivering the media asset for uninterrupted playback at the client device. Alternatively, the quantity of the media asset that has been delivered to the client device can be determined when the indication for playback is received and, based on the quantity delivered, the media asset continues to be delivered to the client device in the highest quality display format for uninterrupted playback at the client device.

In other embodiments, an indication can be received that playback of the media asset at the client device has been stopped or paused. If the media asset is being delivered to the client device in the lower quality display format, then the media asset can again be communicated to the client device in the highest quality display format while playback of the media asset is stopped or paused at the client device. Additionally, after all of a media asset has been delivered and is available for viewing at a client device, a determination can be made that segments of the media asset have been delivered to the client device in the lower quality display format. The segments of the media content can then be communicated to the client device again in the highest quality display format to replace the segments of the media asset that were delivered in the lower quality display format.

BRIEF DESCRIPTION OF THE DRAWINGS

Embodiments of dynamic media asset delivery are described with reference to the following drawings. The same numbers are used throughout the drawings to reference like features and components.

DETAILED DESCRIPTION

Embodiments of dynamic media asset delivery provide that media assets are delivered to a client device in any form of delivery option and in a highest quality display format as can be delivered according to a transmission rate of a communication network and whether a media asset has been initiated for playback at a client device. For instance, delivery of a video to a client device can be started at the highest quality display format that is supported by the available transmission rate of the communication network, and the longer that a user at the client device waits to start viewing the video, the more likely the user will be able to view the video in a high display quality, such as in high-definition.

Dynamic media asset delivery combines the various options of streaming and downloading for a better user experience when a user requests a media asset, such as a video or television program, for viewing. The concept of downloading and streaming content is merged. The user does not need to decide which delivery mechanism to use when requesting a media asset, and conveniently, does not need to ascertain the differences between the various delivery options. When a media asset is requested, but not initiated for playback, available network resources are utilized to download as much of the media asset as possible at the highest quality. The quality of adaptive bitrate streaming is also maximized in an event that the media asset is partially downloaded prior to being initiated for playback.

While features and concepts of the described systems and methods for dynamic media asset delivery can be implemented in any number of different environments, systems, and/or various configurations, embodiments of dynamic media asset delivery are described in the context of the following example systems and environments.

Figure 1:
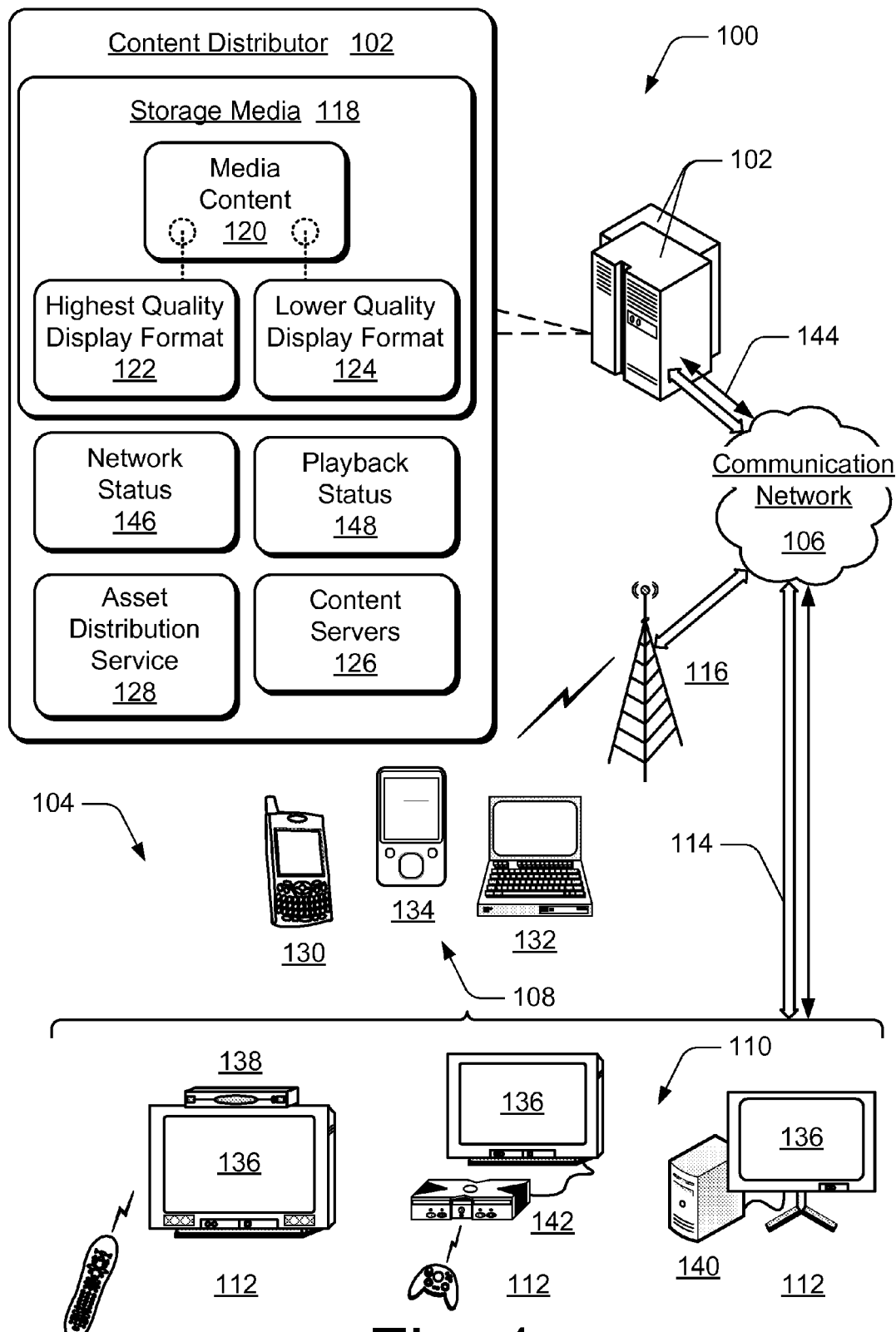
FIG. 1 illustrates an example system in which embodiments of dynamic media asset delivery can be implemented.

FIG. 1 illustrates an example system 100 in which various embodiments of dynamic media asset delivery can be implemented. In this example, system 100 includes a content distributor 102 that can be configured to communicate or otherwise provide media content and data to any number of various user and/or client devices 104 via a communication network 106. The various devices 104 can include wireless devices 108 as well as other client devices 110 (e.g., wired and/or wireless devices) that are implemented as components in various client systems 112 in a media content distribution system.

The communication network 106 can be implemented to include a broadcast network, an IP-based network 114, and/or a wireless network 116 that facilitates media content distribution and data communication between the content distributor 102 and any number of the various devices 104. The communication network 106 can also be implemented as part of a media content distribution system using any type of network topology and/or communication protocol, and can be represented or otherwise implemented as a combination of two or more networks.

In the example system 100, content distributor 102 includes storage media 118 to store or otherwise maintain various data and media content, such as media content 120. The media content 120 can include various display formats of the media content, such as a highest quality display format 122 (e.g., a highest quality, high-definition display format) to a lower quality display format 124 (e.g., a lower quality, standard-definition display format), and any other quality of display format along a continuum between the two.

The storage media 118 can be implemented as any type of memory, random access memory (RAM), a nonvolatile memory such as flash memory, read only memory (ROM), and/or other suitable electronic data storage. The content distributor 102 can also include one or more content servers 126 that are implemented to communicate, or otherwise distribute, the media content 120 and/or other data to any number of the various devices.

Media content (e.g., to include recorded media content) can include any type of audio, video, and/or image media content received from any media content and/or data source. As described herein, media content can include recorded video content, video-on-demand content, television content, television programs (or programming), advertisements, commercials, music, movies, video clips, and other media assets. Other media content can include interactive games, network-based applications, and any other content or data (e.g., to include program guide application data, user interface data, advertising content, closed captions data, content metadata, search results and/or recommendations, etc.).

Content distributor 102 also includes an asset distribution service 128 that can be implemented as computer-executable instructions and executed by processors to implement the various embodiments and/or features of dynamic media asset delivery as described herein. In addition, content distributor 102 can be implemented with any number and combination of differing components as further described with reference to the example device shown in FIG. 4. The asset distribution service 128, as well as other functionality described to implement embodiments of dynamic media asset delivery, can also be provided as a service apart from the content distributor 102 (e.g., on a separate server or by a third party service).

The wireless devices 108 can include any type of device implemented to receive and/or communicate wireless data, such as any one or combination of a mobile phone 130 (e.g., cellular, VoIP, WiFi, etc.), a portable computer device 132, a media device 134 (e.g., a personal media player, portable media player, etc.), and/or any other wireless devices that receive media content in any form of audio, video, and/or image data. Each of the client systems 112 include a respective client device and a display device 136 that together render or playback any form of audio, video, and/or image media content.

A display device 136 can be implemented as any type of a television, high definition television (HDTV), LCD, or similar display system. A client device in a client system 112 can be implemented as any one or combination of a television client device 138 (e.g., a television set-top box, a digital video recorder (DVR), etc.), a computer device 140, a gaming system 142, an appliance device, an electronic device, and/or as any other type of client device that may be implemented to receive media content in any form of audio, video, and/or image data in a media content distribution system.

Any of the user and/or client devices 104 can be implemented with one or more processors, communication components, memory components, signal processing and control circuits, and a media content rendering system. Further, any of the wireless devices 108 and/or other client devices 110 can be implemented with any number and combination of differing components as further described with reference to the example device shown in FIG. 4. Any of the various devices may also be associated with a user (i.e., a person) and/or an entity that operates the device such that a device describes logical devices that include users, software, and/or a combination of devices.

Any of the wireless devices 108 and/or other client devices 110 can communicate with content distributor 102 via a two-way data communication link 144 of the communication network 106. It is contemplated that any one or more of the arrowed communication link 144, IP-based network 114, and wireless network 116, along with communication network 106, facilitate two-way data communication, such as from a device to the content distributor 102 and vice-versa.

In various embodiments, the asset distribution service 128 manages delivery of media assets (e.g., from stored media content 120) to the various devices, such as when a client device communicates a request for a media asset to the content distributor 102. For example, a request for a media asset, such as a television program, can be initiated as a subscription to a program series that includes the media asset. The asset distribution service 128 can manage the subscription and initiate delivery of the television program to the client device when the television program becomes available as part of the program series.

The asset distribution service 128 can receive a request for a media asset from a client device, and then determine a transmission rate of the communication network 106 to deliver the media asset to the client device. The asset distribution service 128 can monitor the communication network and determine a current transmission rate by measuring a packet transmission success rate via the network. Data pertaining to the network status 146 can be maintained at the content distributor 102 to monitor the network.

The asset distribution service 128 can also monitor a playback status 148 of a media asset at a client device to which the media asset is being delivered. For example, the content distributor 102 can receive playback status and/or an indication of media asset playback, such as a play or fast-forward command when initiated at a client device, which would indicate the media asset has been initiated for playback at the client device.

The asset distribution service 128 can initiate communication of a requested media asset to the client device in a highest quality display format as can be delivered according to the transmission rate of the communication network and whether the media asset is initiated for playback at the client device. For instance, delivery of a video to a client device can be started at the highest quality display format that the transmission rate of the communication network will support, and the longer that a user at the client device waits to start viewing the video, the more likely the user will be able to view the video in a high display quality, such as in high-definition.

Consider an example of a video (e.g., a media asset) being delivered to a client device when requested by a user. If the user waits fifteen minutes before initiating playback of the video, but only five minutes of high-definition video has been delivered to the client device, then the quantity of video data to be delivered is reduced to a lower quality display format so that the video is delivered faster. The user will then be able to watch the video uninterrupted (e.g., without the system pausing to catch up on delivery), but at the lower quality display format. Alternatively, if the user waits thirty minutes or longer, for example, before initiating playback of the video, then delivery of the video to the client device can be continued at the highest quality display format and the user will be able to watch the video uninterrupted and in high-definition.

Users will likely become accustomed to waiting for a period of time before initiating playback of a media asset after it has been requested to allow delivery of the media asset in the highest quality display format (e.g., that is feasible based on network conditions and resources). A user will likely plan for the wait period knowing that the media asset can be displayed for viewing in the highest quality display format (e.g., high-definition) if enough of a quantity of the media asset has been delivered prior to initiating playback of the media asset for viewing.

When a media asset is being delivered to a client device, the asset distribution service 128 can receive an indication that the media asset is initiated for playback at the client device. The asset distribution service 128 then determines a quantity of the media asset that has been delivered to the client device when the indication for playback is received. The asset distribution service 128 determines whether the media asset can continue to be delivered in the highest quality display format based on a combination of several factors, such as the quantity of the media asset that has been delivered, the quantity of the media asset left to be delivered, the rate of communication via the network based on the network transmission rate, a rate at which the media asset will be rendered or played back for viewing at the client device, and an assumption that the user will play the media asset from start to finish. Based on these factors, the asset distribution service 128 estimates whether delivery of the media asset can keep up with playback of the media asset at the client device so that the system does not pause the playback to allow delivery of the media asset to catch up.

In an implementation, the asset distribution service 128 can estimate or determine whether delivery of the media asset will keep up with the playback of the media asset by utilizing a delivery determination algorithm and based on the listed definitions as follows:

DEFINITIONS $R_n$=Current Network Achieve Bitrate
$R_c$=Content Bitrate
$T_c$=Content Length
$T_p$=Time of Current Playback Position
$T_d$=Time of Current Download Progress
$R_{min}$=Minimum Download Rate to Successfully Play to End for $R_c$
$B_{remaining}$=Bits of Content Remaining to Download Algorithm Calculate the number of bits remaining to download the remainder of the content from the current download position for a given content bitrate:

$$B_{remaining} = R_c(T_c - T_d)$$

Next, calculate the minimum network bitrate to successfully play the content from the current playback point to the end, assuming that the content is not fast-forwarded:

$$R_{min} = \frac{R_c(T_c - T_d)}{(T_c - T_p)}$$

Assert that the current network bitrate must be greater than $R_{min}$ to download the content at the chosen content bitrate:

$$R_n > R_{min}$$

Solve for $R_c$ to find the following constraint on the highest content bitrate that can be chosen:

$$R_c < \frac{R_n(T_c - T_p)}{(T_c - T_d)}$$

Then choose the highest of the available content bitrates that satisfies this condition. For streaming, $T_p = T_d$ and the condition simplifies to $R_c < R_n$ for a simple adaptive bitrate algorithm.

If the asset distribution service 128 determines that the media asset can not continue to be delivered at the highest quality display format for uninterrupted playback at the client device, then the asset distribution service 128 initiates communication of the media asset to the client device in a lower quality display format to facilitate the media asset being delivered for uninterrupted playback at the client device. While the media asset is being delivered to the client device in the lower quality display format, the asset distribution service 128 can receive an indication that playback of the media asset has been stopped, paused, or otherwise suspended.

In an embodiment, the asset distribution service 128 can optionally continue the delivery of the media asset to the client device in the lower quality display format. In an alternate embodiment, the asset distribution service 128 can again initiate delivery of the media asset to the client device in the highest quality display format while playback of the media asset is stopped at the client device. For example, the user may have initiated playback of the media asset at the client device that resulted in the asset distribution service 128 initiating delivery of the media asset in the lower quality display format. If the user then pauses or stops playback of the media asset, delivery of the media asset to the client device can be adjusted back to the highest quality display format to provide the best possible display quality for viewing when the user again initiates playback of the media asset.

The asset distribution service 128 can also be implemented to determine, after all of a media asset has been delivered and is available for viewing at the client device, that one or more segments of the media asset have been delivered to the client device in the lower quality display format. If segments (e.g., data packets, or groups of data) of the media asset were not delivered in the highest quality display format possible, then the asset distribution service 128 can initiate the content servers 126 to communicate the segments of the media asset to the client device in the highest quality display format to replace the segments that were delivered in the lower quality display format.

Although illustrated and described as a component or module of the content distributor 102, the asset distribution service 128 can be implemented as an independent service to implement embodiments of dynamic media asset delivery. Further, although the asset distribution service is illustrated and described as a single component or module, the asset distribution service 128 can be implemented as several component applications or modules distributed to implement various embodiments of dynamic media asset delivery as described herein.

Example methods 200 and 300 are described with reference to respective FIGS. 2 and 3 in accordance with one or more embodiments of dynamic media asset delivery. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example methods may be described in the general context of computer-executable instructions, which can include software, applications, routines, programs, objects, components, data structures, procedures, modules, functions, and the like.

The methods may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 2:
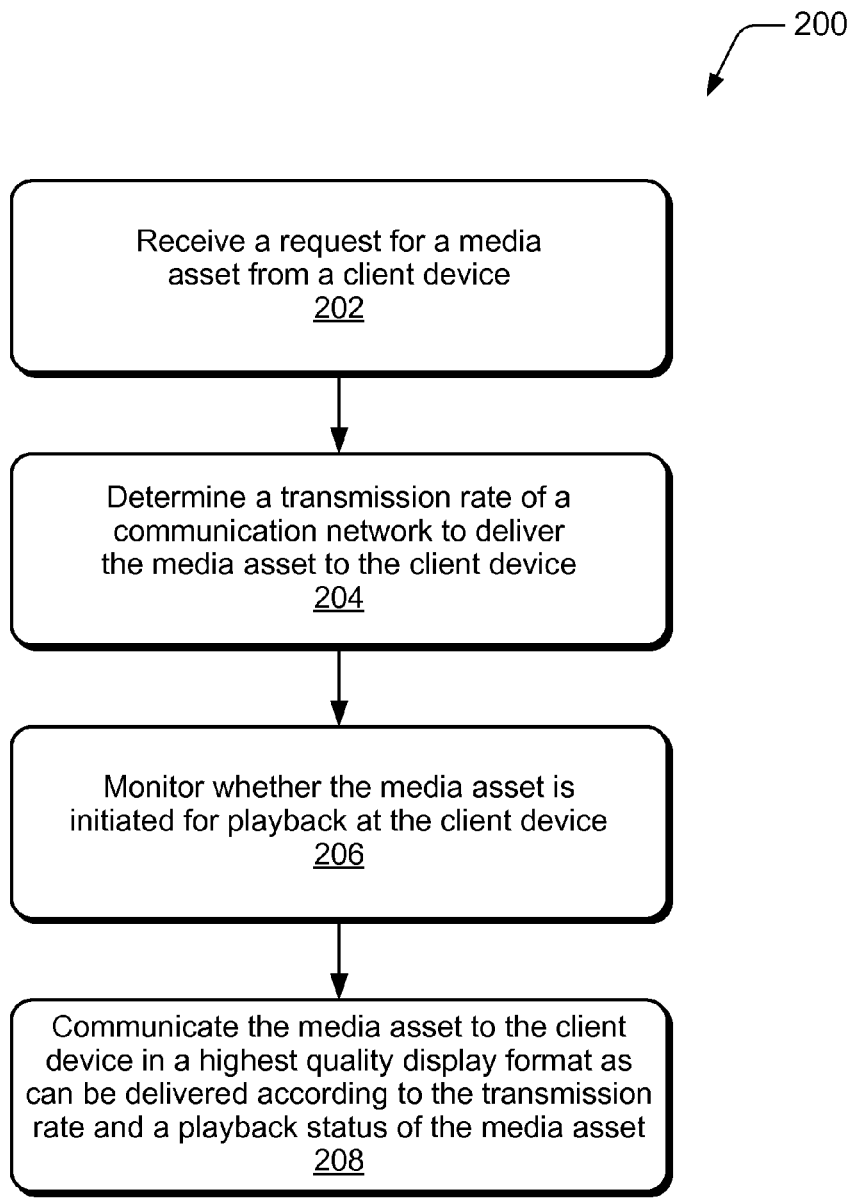
FIG. 2 illustrates example method(s) for dynamic media asset delivery in accordance with one or more embodiments.

FIG. 2 illustrates example method(s) 200 of dynamic media asset delivery. The order in which the method is described is not intended to be construed as a limitation, and any number of the described method blocks can be combined in any order to implement the method, or an alternate method.

At block 202, a request for a media asset is received from a client device. For example, the content distributor 102 (FIG. 1) receives a request for a media asset (e.g., from stored media content 120) from a user via a client device 104. In an implementation, the request is received as a subscription for a program series that includes the media asset, and the media asset is initiated for delivery when the media asset becomes available as part of the program series.

At block 204, a transmission rate of a communication network is determined to deliver the media asset to the client device. For example, the asset distribution service 128 at content distributor 102 determines a transmission rate of the communication network 106 to deliver the media asset to the client device. In an implementation, the asset distribution service 128 monitors the communication network and determines a current transmission rate by measuring a packet transmission success rate via the network.

At block 206, the client device is monitored to determine whether the media asset is initiated for playback at the client device. For example, the asset distribution service 128 monitors a playback status 148 of a media asset at the client device to which the media asset is being delivered. The content distributor 102 receives playback status and/or an indication of media asset playback when initiated at a client device.

At block 208, the media asset is communicated to the client device in a highest quality display format as can be delivered according to the transmission rate of the communication network and whether the media asset is initiated for playback at the client device. For example, the asset distribution service 128 initiates communication of a requested media asset 120 to the client device 104 in a highest quality display format 122 as can be delivered according to the transmission rate of the communication network 106 and whether the media asset is initiated for playback at the client device. For instance, delivery of a video to a client device is started at the highest quality display format that is supported by the transmission rate of the communication network, and the longer that a user at the client device waits to start viewing the video, the more likely the user will be able to view the video in a high display quality, such as in high-definition.

Figure 3:
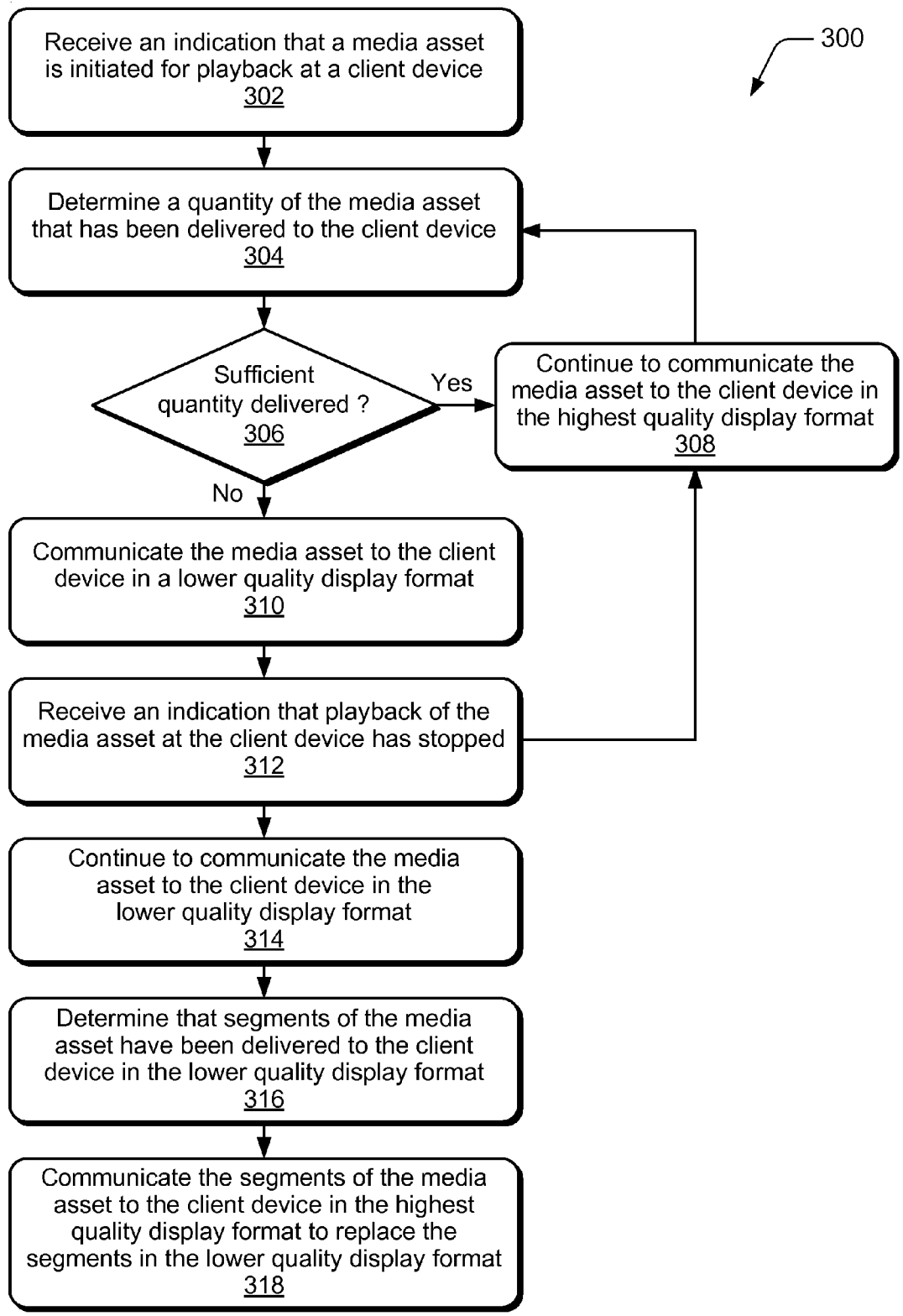
FIG. 3 illustrates example method(s) for dynamic media asset delivery in accordance with one or more embodiments.

FIG. 3 illustrates example method(s) 300 of dynamic media asset delivery. The order in which the method is described is not intended to be construed as a limitation, and any number of the described method blocks can be combined in any order to implement the method, or an alternate method.

At block 302, an indication that a media asset is initiated for playback at a client device is received. For example, when a media asset (e.g., from stored media content 120) is being delivered to a client device 104, the asset distribution service 128 (FIG. 1) receives an indication that the media asset is initiated for playback at the client device. At block 304, a quantity of the media asset that has been delivered to the client device is determined. For example, the asset distribution service 128 then determines a quantity of the media asset that has been delivered to the client device when the indication for playback is received.

At block 306, a determination is made as to whether a sufficient quantity of the media asset has been delivered to the client device to facilitate uninterrupted playback at the client device. For example, the asset distribution service 128 determines whether the media asset can continue to be delivered in the highest quality display format 122 based on a combination of several factors, such as the quantity of the media asset that has been delivered, the quantity of the media asset left to be delivered, the rate of communication via the network based on the network transmission rate, a rate at which the media asset will be rendered or played back for viewing at the client device, and an assumption that the user will play the media asset from start to finish. Based on these factors, the asset distribution service 128 estimates whether delivery of the media asset can keep up with playback of the media asset at the client device so that the system does not pause the playback to allow the delivery to catch up.

If a sufficient quantity of the media asset has been delivered to the client device (i.e., "yes" from block 306), then at block 308, the media asset continues to be delivered to the client device in the highest quality display format for uninterrupted playback at the client device. If a sufficient quantity of the media asset has not been delivered to the client device (i.e., "no" from block 306), then at block 310, the media asset is delivered to the client device in a lower quality display format. For example, if the asset distribution service 128 determines that the media asset can not continue to be delivered at the highest quality display format for uninterrupted playback at the client device, then the asset distribution service 128 initiates communication of the media asset to the client device in a lower quality display format to facilitate the media asset being delivered for uninterrupted playback at the client device.

At block 312, an indication is received that playback of the media asset at the client device has stopped. For example, while the media asset is being delivered to the client device in the lower quality display format, the asset distribution service 128 receives an indication that playback of the media asset has been stopped, paused, or otherwise suspended. In an embodiment, the asset distribution service 128 can again initiate delivery of the media asset to the client device in the highest quality display format at block 308 while playback of the media asset is stopped at the client device. In an alternate embodiment at block 314, the media asset continues to be delivered to the client device at the lower quality display format. For example, the asset distribution service 128 can optionally continue the delivery of the media asset (e.g., via the content servers 126) to the client device in the lower quality display format.

At block 316, segments of the media asset are determined to have been delivered to the client device in the lower quality display format. For example, the asset distribution service 128 determines that one or more segments of the media asset have been delivered to the client device in the lower quality display format after all of the media asset has been delivered and is available for viewing at the client device.

At block 318, the segments of the media asset are communicated to the client device in the highest quality display format to replace the segments of the media asset that have been delivered to the client device in the lower quality display format. For example, the asset distribution service 128 initiates the content servers 126 to communicate the segments of the media asset to the client device in the highest quality display format 122 to replace the segments that were delivered in the lower quality display format 124.

Figure 4:
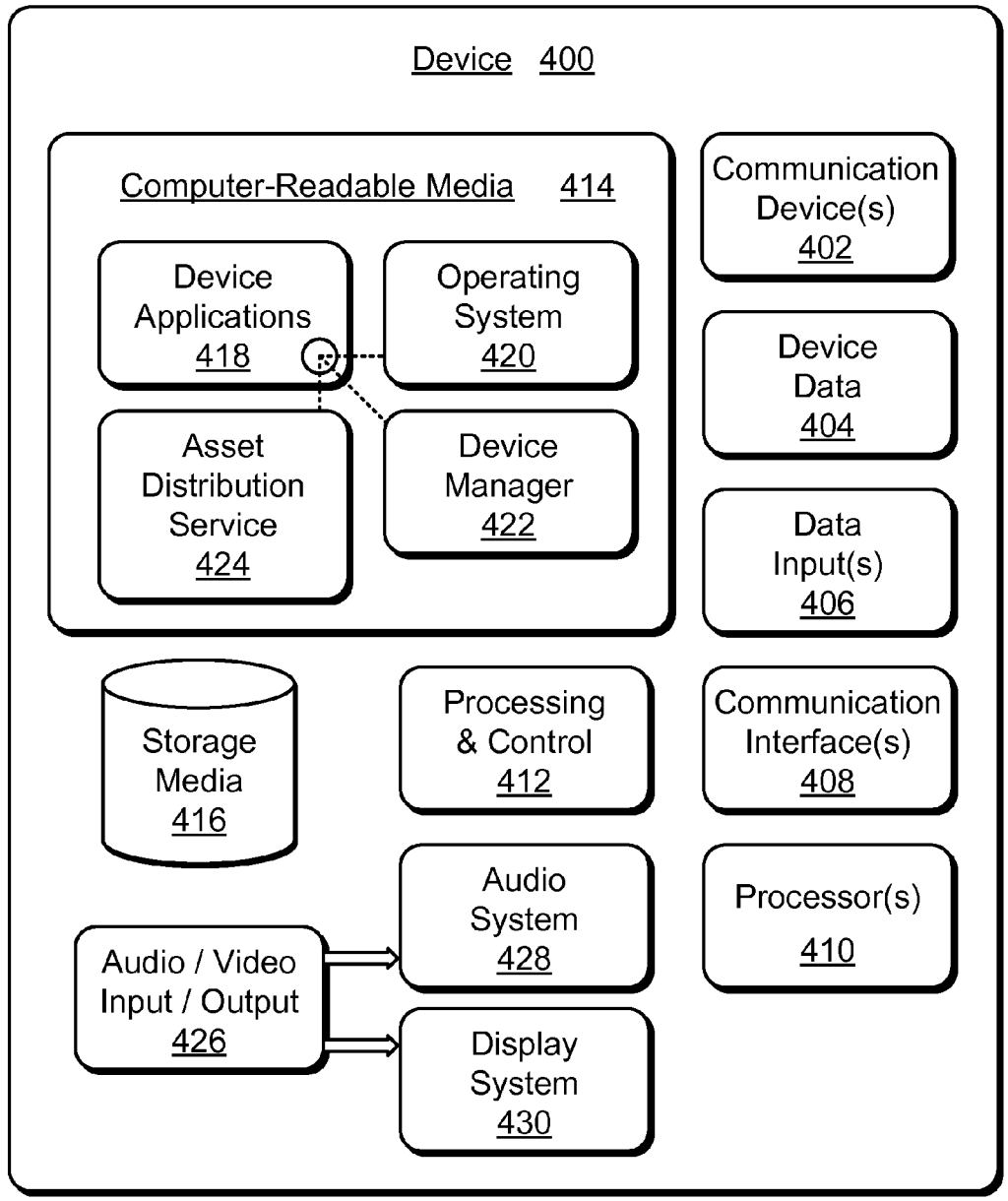
FIG. 4 illustrates various components of an example device that can implement embodiments of dynamic media asset delivery.

FIG. 4 illustrates various components of an example device 400 that can be implemented as any type of client device and/or content distributor as described with reference to FIG. 1 to implement embodiments of dynamic media asset delivery. In embodiments, device 400 can be implemented as any one or combination of a wired and/or wireless device, as any form of television client device (e.g., television set-top box, digital video recorder (DVR), etc.), consumer device, computer device, portable computer device, user device, communication device, video processing and/or rendering device, appliance device, gaming device, electronic device, and/or as any other type of device. Device 400 may also be associated with a user (i.e., a person) and/or an entity that operates the device such that a device describes logical devices that include users, software, firmware, and/or a combination of devices.

Device 400 includes communication devices 402 that enable wired and/or wireless communication of device data 404 (e.g., received data, data that is being received, data scheduled for broadcast, data packets of the data, etc.). The device data 404 or other device content can include configuration settings of the device, media content stored on the device, and/or information associated with a user of the device. Media content stored on device 400 can include any type of audio, video, and/or image data. Device 400 includes one or more data inputs 406 via which any type of data, media content, and/or inputs can be received, such as user-selectable inputs, messages, music, television media content, recorded video content, and any other type of audio, video, and/or image data received from any content source and/or data source.

Device 400 also includes communication interfaces 408 that can be implemented as any one or more of a serial and/or parallel interface, a wireless interface, any type of network interface, a modem, and as any other type of communication interface. The communication interfaces 408 provide a connection and/or communication links between device 400 and a communication network by which other electronic, computing, and communication devices can communicate data with device 400.

Device 400 can include one or more processors 410 (e.g., any of microprocessors, controllers, and the like) which process various computer-executable instructions to control the operation of device 400 and to implement embodiments of dynamic media asset delivery. Alternatively or in addition, device 400 can be implemented with any one or combination of hardware, firmware, or fixed logic circuitry that is implemented in connection with processing and control circuits which are generally identified at 412. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 400 can also include computer-readable media 414, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 400 can also include a mass storage media device 416.

Computer-readable media 414 provides data storage mechanisms to store the device data 404, as well as various device applications 418 and any other types of information and/or data related to operational aspects of device 400. For example, an operating system 420 can be maintained as a computer application with the computer-readable media 414 and executed on processors 410. The device applications 418 can include a device manager 422 (e.g., a control application, software application, signal processing and control module, code that is native to a particular device, a hardware abstraction layer for a particular device, etc.). The device applications 418 can also include any system components or modules of an asset distribution service 424 to implement the various embodiments of dynamic media asset delivery as described herein. In this example, the device applications 418 are shown as software modules and/or computer applications. Alternatively or in addition, the asset distribution service 424 can be implemented as hardware, software, firmware, or any combination thereof.

Device 400 can also include an audio and/or video input-output system 426 that provides audio data to an audio system 428 and/or provides video data to a display system 430. The audio system 428 and/or the display system 430 can include any devices that process, display, and/or otherwise render audio, video, and image data. Video signals and audio signals can be communicated from device 400 to an audio device and/or to a display device via an RF (radio frequency) link, S-video link, composite video link, component video link, DVI (digital video interface), analog audio connection, or other similar communication link. In an embodiment, audio system 428 and/or the display system 430 can be implemented as external components to device 400. Alternatively, the audio system 428 and/or the display system 430 can be implemented as integrated components of example device 400.

Although embodiments of dynamic media asset delivery have been described in language specific to features and/or methods, the subject of the appended claims is not necessarily limited to the specific features or methods described. Rather, the specific features and methods are disclosed as example implementations of dynamic media asset delivery.

The invention claimed is:

1. A method implemented by a client device, the method comprising:
   requesting a media asset from a content distributor for playback at the client device;
   receiving the media asset over a communication network at the client device;

receiving a request to playback the media asset for viewing as the media asset is being received; and playing back the media asset for viewing in a display format, a quality of the display format based at least in part on a time duration between when the media asset is requested and when the request to playback the media asset for viewing is received.

2. The method as recited in claim 1, wherein the quality of the display format increases as the time duration increases between when the media asset is requested and when the request to playback the media asset for viewing is received.

3. The method as recited in claim 1, wherein a quantity of the media asset increases as the time duration increases between when the media asset is requested and when the request to playback the media asset for viewing is received.

4. The method as recited in claim 3, wherein the media asset is played back for viewing in a highest quality display format if enough of the quantity of the media asset has been received at the client device prior to receiving the request to playback the media asset for viewing.

5. The method as recited in claim 4, wherein the highest quality display format comprises a high definition display format.

6. The method as recited in claim 3, wherein the media asset is played back for viewing in a lower quality display format if not enough of the quantity of the media asset has been received at the client device prior to receiving the request to playback the media asset for viewing.

7. The method as recited in claim 1, wherein the quality of the display format is based at least in part on a transmission rate of the communication network.

8. A client device, comprising:
a display device configured to display media assets for viewing;
at least a memory and a processor to implement a media asset application configured to:
request a media asset from a content distributor for playback;
receive the media asset over a communication network;
receive a request to render the media asset for viewing as the media asset is being received; and
render the media asset for viewing on the display device in a display format, a quality of the display format based at least in part on a time duration between when the media asset is requested and when the request to render the media asset for viewing is received.

9. The client device as recited in claim 8, wherein the quality of the display format increases as the time duration increases between when the media asset is requested and when the request to render the media asset for viewing is received.

10. The client device as recited in claim 8, wherein a quantity of the media asset increases as the time duration increases between when the media asset is requested and when the request to render the media asset for viewing is received.

11. The client device as recited in claim 10, wherein the media asset is rendered for viewing in a highest quality display format if enough of the quantity of the media asset has been received prior to the request to render the media asset for viewing.

12. The client device as recited in claim 11, wherein the highest quality display format comprises a high definition display format.

13. The client device as recited in claim 10, wherein the media asset is rendered for viewing in a lower quality display format if not enough of the quantity of the media asset has been received prior to the request to render the media asset for viewing.

14. The client device as recited in claim 8, wherein the quality of the display format is based at least in part on a transmission rate of the communication network.

15. A computer-readable memory storage device comprising instructions that are executable and, responsive to executing the instructions, a computing device:
requests a media asset from a content distributor for playback;
receives the media asset over a communication network;
receives a request to playback the media asset for viewing as the media asset is being received; and
plays back the media asset for viewing in a display format, a quality of the display format based at least in part on a time duration between when the media asset is requested and when the request to playback the media asset for viewing is received.

16. The computer-readable memory storage device as recited in claim 15, wherein the computing device increases the quality of the display format as the time duration increases between when the media asset is requested and when the request to playback the media asset for viewing is received.

17. The computer-readable memory storage device as recited in claim 15, wherein the computing device increases a quantity of the media asset as the time duration increases between when the media asset is requested and when the request to playback the media asset for viewing is received.

18. The computer-readable memory storage device as recited in claim 17, wherein the computing device plays back the media asset for viewing in a highest quality display format if enough of the quantity of the media asset has been received prior to the request to playback the media asset for viewing.

19. The computer-readable memory storage device as recited in claim 18, wherein the highest quality display format comprises a high definition display format.

20. The computer-readable memory storage device as recited in claim 17, wherein the computing device plays back the media asset for viewing in a lower quality display format if not enough of the quantity of the media asset has been received prior to the request to playback the media asset for viewing.

* * * * *